(12) United States Patent
Borg

(10) Patent No.: US 6,206,390 B1
(45) Date of Patent: Mar. 27, 2001

(54) SKATEBOARD APPARATUS

(76) Inventor: Steve Borg, 8258 Ocean View Ave., Whittier, CA (US) 90602

( * ) Notice: Subject to any disclaimer, the term of this patent is extended or adjusted under 35 U.S.C. 154(b) by 0 days.

(21) Appl. No.: 09/564,722

(22) Filed: May 4, 2000

(51) Int. Cl.[7] ................ B62M 1/00; B62K 1/00
(52) U.S. Cl. ................ 280/87.042; 280/268
(58) Field of Search .............. 280/87.041, 87.042, 280/263, 11.28, 14.28, 268, 267

(56) References Cited

U.S. PATENT DOCUMENTS

| | | | |
|---|---|---|---|
| 1,548,973 | * 8/1925 | Beeler | 280/263 |
| 1,572,789 | * 2/1926 | Griffin | 280/14.28 |
| 2,198,667 | * 4/1940 | Hagenes | 280/87.042 |
| 2,533,740 | * 12/1950 | Murray | 280/11.28 |
| 2,719,724 | * 10/1955 | Lundgren | 280/11.223 |
| 2,819,907 | * 1/1958 | Thoresen | 280/87.042 |
| 3,023,022 | * 2/1962 | Boyden | 280/87.042 |
| 3,203,706 | * 8/1965 | Boyden | 280/87.041 |
| 3,954,279 | * 5/1976 | Guerr | 280/87.042 |
| 4,040,639 | * 8/1977 | Scardenzan | 280/87.042 |
| 4,093,252 | * 6/1978 | Rue | 280/87.042 |
| 4,138,128 | * 2/1979 | Criss | 280/87.042 |
| 4,230,330 | * 10/1980 | Muhammad | 280/87.042 |
| 4,289,325 | * 9/1981 | Whitacre | 280/87.042 |
| 4,323,258 | * 4/1982 | Culpeper | 280/87.041 |
| 4,336,952 | * 6/1982 | Rochman | 280/87.01 |
| 4,460,187 | * 7/1984 | Shimizu | 280/87.042 |
| 4,555,122 | * 11/1985 | Harvey | 280/87.041 |
| 4,838,564 | * 6/1989 | Jarvis | 280/11.28 |
| 5,114,166 | * 5/1992 | McCosker | 280/87.042 |
| 5,347,681 | * 9/1994 | Wattron et al. | 280/87.042 |
| 5,927,732 | * 7/1999 | Snyder | 280/87.042 |
| 5,947,495 | * 9/1999 | Null et al. | 280/87.042 |
| 5,984,328 | * 11/1999 | Tipton | 280/87.042 |
| 5,997,018 | * 12/1999 | Lee | 280/87.042 |

* cited by examiner

*Primary Examiner*—Brian L. Johnson
*Assistant Examiner*—Joselynn Y. Sliteris

(57) ABSTRACT

A skateboard apparatus for higher turning capabilities. The skateboard apparatus includes a board for supporting a user. The board has a top surface, a bottom surface, a front end and a back end. A first wheel assembly is coupled to the bottom surface of the board. The first wheel assembly is positioned generally nearer the back end than the front end. A second wheel assembly is coupled to the bottom surface of the board and is positioned generally nearer the front end than the back end of the board. The second wheel assembly generally comprises an axle and a pair of wheels. The axle is adapted to rotate with respect to a longitudinal axis of the board. A steering assembly is used for altering the rotational direction of the wheels of the second wheel assembly. The steering assembly has a first end coupled to the second wheel assembly. The steering assembly extends away from the second wheel assembly such that a user may grasp a free end of the steering assembly.

7 Claims, 3 Drawing Sheets

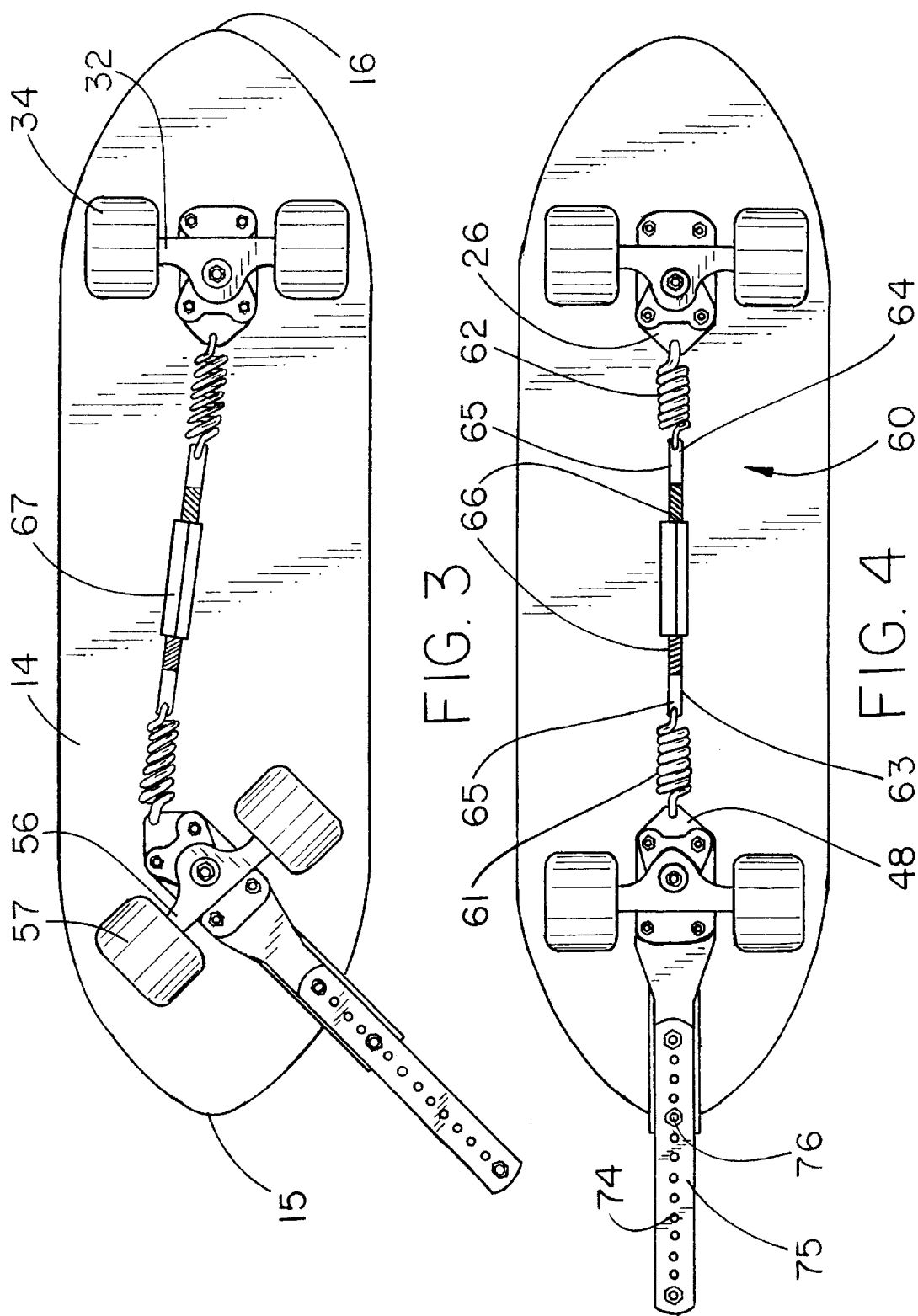

SKATEBOARD APPARATUS

BACKGROUND OF THE INVENTION

1. Field of the Invention

The present invention relates to skateboards and more particularly pertains to a new skateboard apparatus for higher turning capabilities.

2. Description of the Prior Art

The use of skateboards is known in the prior art. More specifically, skateboards heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 4,951,958; 4,274,647; 4,289,325; 5,221,111; 5,232,235; and U.S. Des. Pat. No. 304,360.

While these devices fulfill their respective, particular objectives and requirements, the aforementioned patents do not disclose a new skateboard apparatus. The inventive device includes a board for supporting a user. The board has a top surface, a bottom surface, a front end and a back end. A first wheel assembly is coupled to the bottom surface of the board. The first wheel assembly is positioned generally nearer the back end than the first end. A second wheel assembly is coupled to the bottom surface of the board and is positioned generally nearer the front end than the back end of the board. The second wheel assembly generally comprises an axle and a pair of wheels. The axle is adapted to rotate with respect to a longitudinal axis of the board. A steering assembly is used for altering the rotational direction of the wheels of the second wheel assembly. The steering assembly has a first end coupled to the second wheel assembly. The steering assembly extends away from the second wheel assembly such that a user may grasp a free end of the steering assembly.

In these respects, the skateboard apparatus according to the present invention substantially departs from the conventional concepts and designs of the prior art, and in so doing provides an apparatus primarily developed for the purpose of higher turning capabilities.

SUMMARY OF THE INVENTION

In view of the foregoing disadvantages inherent in the known types of skateboards now present in the prior art, the present invention provides a new skateboard apparatus construction wherein the same can be utilized for higher turning capabilities.

The general purpose of the present invention, which will be described subsequently in greater detail, is to provide a new skateboard apparatus which has many of the advantages of the skateboards mentioned heretofore and many novel features that result in a new skateboard apparatus which is not anticipated, rendered obvious, suggested, or even implied by any of the prior art skateboards, either alone or in any combination thereof.

To attain this, the present invention generally comprises a board for supporting a user. The board has a top surface, a bottom surface, a front end and a back end. A first wheel assembly is coupled to the bottom surface of the board. The first wheel assembly is positioned generally nearer the back end than the first end. A second wheel assembly is coupled to the bottom surface of the board and is positioned generally nearer the front end than the back end of the board. The second wheel assembly generally comprises an axle and a pair of wheels. The axle is adapted to rotate with respect to a longitudinal axis of the board. A steering assembly is used for altering the rotational direction of the wheels of the second wheel assembly. The steering assembly has a first end coupled to the second wheel assembly. The steering assembly extends away from the second wheel assembly such that a user may grasp a free end of the steering assembly.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new skateboard apparatus apparatus and method which has many of the advantages of the skateboards mentioned heretofore and many novel features that result in a new skateboard apparatus which is not anticipated, rendered obvious, suggested, or even implied by any of the prior art skateboards, either alone or in any combination thereof.

It is another object of the present invention to provide a new skateboard apparatus which may be easily and efficiently manufactured and marketed.

It is a further object of the present invention to provide a new skateboard apparatus which is of a durable and reliable construction.

An even further object of the present invention is to provide a new skateboard apparatus which is susceptible of a low cost of manufacture with regard to both materials and labor, and which accordingly is then susceptible of low prices of sale to the consuming public, thereby making such skateboard apparatus economically available to the buying public.

Still yet another object of the present invention is to provide a new skateboard apparatus which provides in the apparatuses and methods of the prior art some of the advantages thereof, while simultaneously overcoming some of the disadvantages normally associated therewith.

Still another object of the present invention is to provide a new skateboard apparatus for higher turning capabilities.

Yet another object of the present invention is to provide a new skateboard apparatus which includes a board for supporting a user. The board has a top surface, a bottom surface, a front end and a back end. A first wheel assembly is coupled to the bottom surface of the board. The first wheel assembly is positioned generally nearer the back end than the first end. A second wheel assembly is coupled to the bottom surface of the board and is positioned generally nearer the front end than the back end of the board. The second wheel assembly generally comprises an axle and a pair of wheels. The axle is adapted to rotate with respect to a longitudinal axis of the board. A steering assembly is used for altering the rotational direction of the wheels of the second wheel assembly. The steering assembly has a first end coupled to the second wheel assembly. The steering assembly extends away from the second wheel assembly such that a user may grasp a free end of the steering assembly.

Still yet another object of the present invention is to provide a new skateboard apparatus that has a front wheel axle which pivotal with respect to the board.

Even still another object of the present invention is to provide a new skateboard apparatus that has a biasing means for biasing the pivotal axle such that the wheel are directed forward the board.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a schematic bottom view of the present invention.

FIG. 4 is a schematic bottom view of the present invention.

DESCRIPTION OF THE PREFERRED EMBODIMENT

Figure 1:
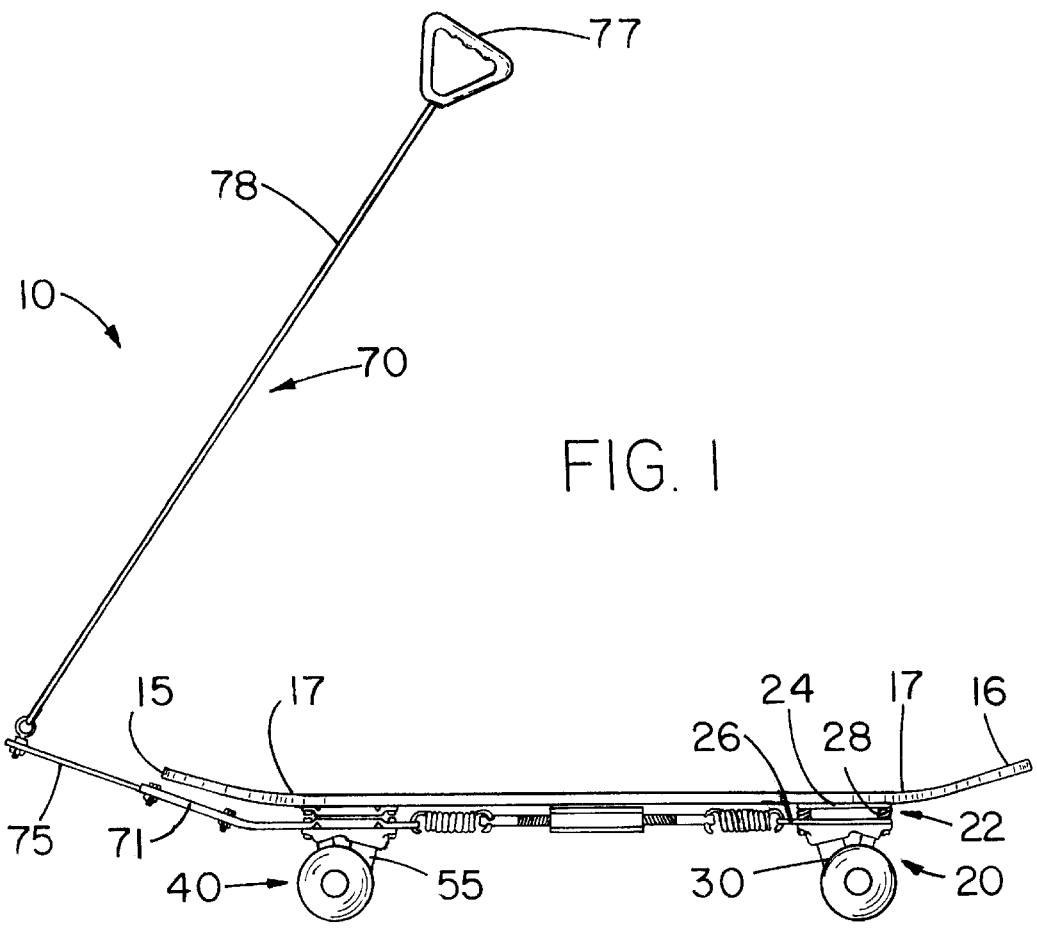
FIG. 1 is a schematic side view of a new skateboard apparatus according to the present invention.

With reference now to the drawings, and in particular to FIGS. 1 through 6 thereof, a new skateboard apparatus embodying the principles and concepts of the present invention and generally designated by the reference numeral 10 will be described.

As best illustrated in FIGS. 1 through 6, the skateboard apparatus 10 generally comprises a board 12, a first 20 and second 40 wheel assembly and a steering assembly 70.

Figure 2:
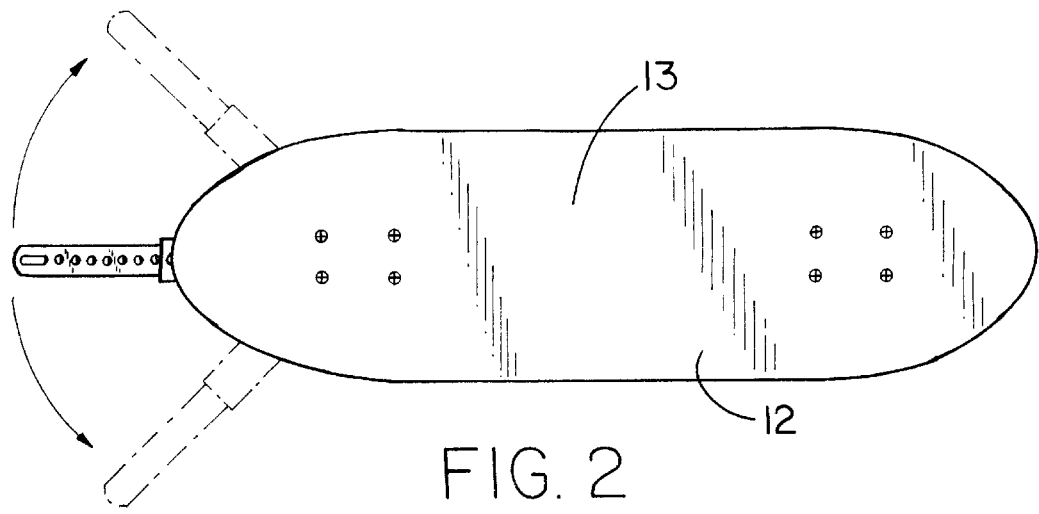
FIG. 2 is a schematic top view of the present invention.
Figure 5:
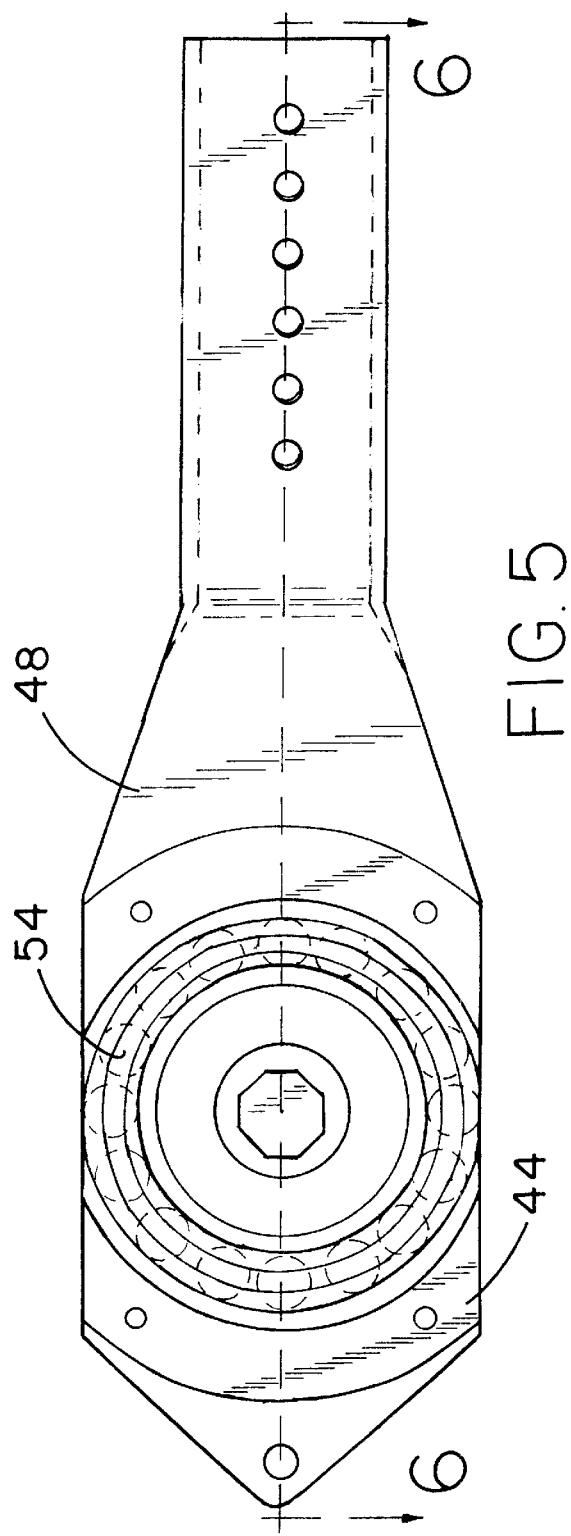
FIG. 5 is a schematic exploded view of the fixed and rotating plates of the second wheel assembly of the present invention.

The board 12 is for supporting a user. The board 12 has a top surface 13 and a bottom surface 14, a front end 15 and a back end 16. The front 15 and back 16 ends are tapered such that the front and back ends comprise rounded edges as shown in FIG. 2. The board 12 has a pair of bends 17 therein. One of the bends 17 is generally nearer the front end 15 and one of the bends is generally nearer the back end 16, such that the front 15 and back 16 ends are angled upwardly with respect to a central portion of the board 12.

The first wheel assembly 20 includes a suspension assembly 22 and a first truck assembly 30. The suspension assembly 22 is coupled to the bottom surface 14 of the board 12, and is positioned generally adjacent to the back end 16 of the board 12. The suspension assembly 22 comprises a first 24 and second 26 plate having a plurality of biasing means 28 therebetween for biasing the first plate 24 away from the second plate 26. The first plate 24 is coupled to the bottom surface 14 of the board 12. Each of the biasing means 28 is a springs. The springs allow the user to tilt the board 12 with respect to a surface without the wheels leaving the surface, and give a shock absorber effect when the user performs aerial actions with the device 10. A conventional boss and saddle may also be used or any other conventional wheel assembly which is used in skateboards.

The first truck assembly 30 is mounted to the second plate 26. The first truck assembly 30 comprises an axle 32 having a pair of wheels 34 mounted thereto. The axle 32 has a longitudinal axis orientated generally perpendicular to a longitudinal axis of the board 12.

Figure 6:
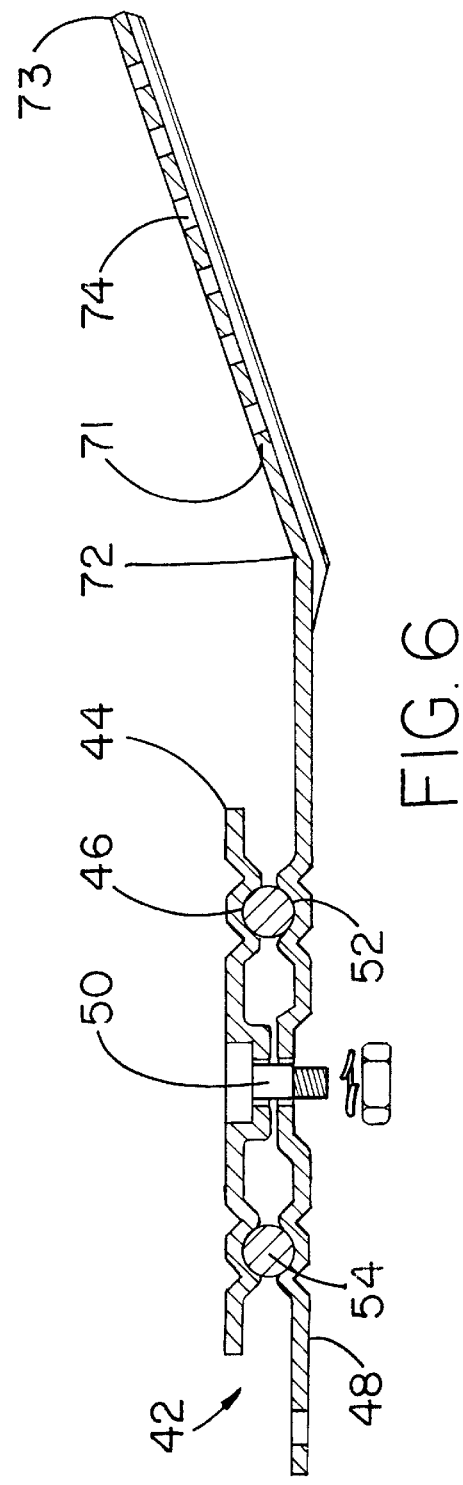
FIG. 6 is a schematic cross-sectional view taken along line 6—6 of FIG. 5 of the present invention.

The second wheel assembly 40 includes a rotation assembly 42. The rotation assembly 42 is mounted to the bottom surface 14 of the board 12, and is generally adjacent to the front end 15 of the board 12. The rotation assembly 42 comprises a fixed plate 44 and a rotating plate 48. The fixed plate 44 is mounted to the bottom surface 14 of the board 12. The fixed plate 44 has an annular groove 46 therein, which faces away from the board 12. The rotating plate 48 is rotatably coupled to the fixed plate 44 using conventional means such as a bolt 50 which is depicted in FIG. 6. The rotating plate 48 has an annular groove 52 therein such that the annular groove 46 in the fixed plate 44 is generally opposite of the annular groove 52 in the rotation plate 48. A plurality of ball bearings 54 is between the annular grooves 46, 52 in the fixed 44 and rotation 48 plates.

A second truck assembly 55 is mounted to the rotation plate 48. The second truck assembly 55 comprises an axle 56 having a pair of wheels 57 mounted thereto. Any conventional wheel assembly may be utilized as long as the axle of the second wheel assembly rotates, or pivots, with respect to the board such that the line of rotational direction of the wheels may be altered with respect to the longitudinal axis of the board 12. Also, another embodiment, not shown, utilizes only one wheel for the second wheel assembly for greater turning ability.

A biasing member 60 biases the second wheel assembly 40 in a first position such that the second wheel assembly 40 is generally directed in the same direction as the first wheel assembly 20 as is depicted in FIG. 4.

The biasing member 60 has a pair of springs 61, 62. Each of the springs 61, 62 has a pair of ends. One of the ends of a first spring 61 is coupled to the rotating plate 48, and one of the ends of the second spring 62 is coupled to the second plate 26.

Each of a pair of rods 63, 64 has a distal portion 65 and a proximal portion 66. The external surfaces of the proximal portions 66 are threaded. Each of the springs 61, 62 is coupled to the distal portion 65 of one of the rods 63, 64.

A coupling means 67 removably couples the rods 63, 64 together. The coupling means 67 is a tubular member, which is generally hollow and has an internal surface that is threaded. Each of the rods 63, 64 have a proximal portion 66 removably inserted in an end of the tubular member. Tension between the rotating plate 48 and the second plate may be increased by rotating the coupling means 67 in a first direction and decreased by rotating the coupling means 67 in an opposite direction. The biasing member 60 may be any member having elastic properties and a first and second end such that the first end is attached to the first wheel assembly and the second end is attached to the portion of the second wheel assembly allowing the axle of the second wheel assembly to turn.

The steering assembly 70 alters the line of rotational direction of the wheels of the second wheel assembly 40. The steering assembly 70 includes a first extension member 71. The first extension member 71 is elongate and has a first end 72 and second end 73. The first end 72 is integrally coupled to the rotating plate 48 and extends away from the rotating plate 48 such that the second end 73 extends beyond the front end 15 of the board 12. The first extension member 71 has a plurality of apertures 74 therein.

A second extension member 75 is elongate and also has a plurality of apertures 74 therein. The second extension member 75 is removably fastened to the first extension 71 member by a pair of fastening members 76 extending through the apertures 74 in the first 71 and second 75 extension member. Each of the fastening members 76 is a bolt and nut. The second extension member 75 may be adjusted such that it is closer or further away from the second wheel assembly 40 depending on the user's need.

A handle portion 77 is used for the user to grip onto, and a connector means 78 connects the handle portion 77 to a free end of the second extension member 75. The connector means 78 is an elongate flexible member having a first and second end. The first end is fixedly coupled to the handle portion 77. The second end is removably coupled to an aperture 74 located generally adjacent to a free end of the second extension member 75. The connector means 78 is a cable, cord, rope or some other similar member.

In use, the user rides the skateboard device like any other skateboard, however the rotational ability of the second wheel assembly 40 allows greater turning ability for the user. The biasing member 60 pulls the wheels of the second wheel assembly 40 into alignment with the wheels of the first wheel assembly 20 and the steering assembly 70 aids the user in overcoming the biasing member 60.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A skateboard device, said device comprising:
   a board for supporting a user, said board having a top surface and a bottom surface, said board having a front end and a back end;
   a first wheel assembly, said first wheel assembly being coupled to said bottom surface of said board, said first wheel assembly being positioned generally nearer said back end than said front end, said first wheel assembly including a pair of wheels;
   a second wheel assembly, said second wheel assembly being coupled to said bottom surface of said board and being positioned generally nearer said front end than said back end of said board, said second wheel assembly generally comprising an axle and a pair of wheels, said axle being adapted to pivot about an axis oriented substantially perpendicular to the bottom surface of said board;
   a steering assembly for altering the rotational direction of the wheels of said second wheel assembly, said steering assembly having a first end coupled to said second wheel assembly and extending away therefrom;
   wherein said first wheel assembly further comprises:
      a suspension assembly being coupled to said bottom surface of said board, said suspension assembly being positioned generally adjacent to said back end of said board;
      a first truck assembly being mounted to said suspension assembly;
   wherein said second wheel assembly further comprises:
      a rotation assembly comprising a fixed plate fixedly mounted to said board and a rotating plate rotatable coupled to said fixed plate;
      a second truck assembly being mounted to said rotating plate such that said second truck assembly may pivot with respect to said board;
      a biasing member for biasing said second wheel assembly into a first position such that the wheels of said second wheel assembly are generally directed in the same direction as said first wheel assembly, said biasing member having a first end and a second end, said first end being coupled to said first wheel assembly and said second end being coupled to said rotating plate; said biasing member further comprises:
         a pair of springs, each of said springs having a pair of ends, one of said ends of a first spring being coupled to said rotating plate, one of said ends of a second spring being coupled to said first wheel assembly;
         a pair of rods, each of said rods having a distal portion and a proximal portion, an external surface of said proximal portions being threaded, each of said springs being coupled to the distal portion of one of said rods; and
         a coupling means for removably coupling said rods together, said coupling means comprising a tubular member, said tubular member being generally hollow and having an internal surface being threaded, wherein each of said rods have a proximal portion removably inserted in an end of said tubular member.

2. The skateboard device as in claim 1, wherein said suspension assembly comprises:
   a first and second plate having a plurality of biasing means therebetween for biasing said first plate away from said second plate, said first plate being coupled to said bottom surface of said board, each of said biasing means being springs.

3. The skateboard device as in claims 2, wherein said first truck assembly comprises:
   an axle having said wheels rotatably coupled thereto said axle having a longitudinal axis orientated generally perpendicular to a longitudinal axis of said board.

4. The skateboard device as in claim 1, wherein
   said fixed plate has an annular groove therein, said annular groove facing away from said board, said rotating plate having an annular groove therein such that said annular groove in said fixed plate is generally opposite of said annular groove in said rotating plate, a plurality of ball bearings being between said annular grooves in said fixed and rotating plates.

5. The skateboard device as in claim 1, wherein said steering assembly further comprises:
   a first extension member being elongate and having a first end and a second end, said first end being integrally coupled to said rotating plate, said first extension member extending away from said rotating plate such that said second end extends beyond said front end of said board, said first extension member having a plurality of apertures therein;
   a second extension member being elongate, said second extension member having a plurality of apertures therein, said second extension member being removably fastened to said first extension member by a pair of fastening members extending through said apertures in said first and second extension members;
   a handle portion;
   a connector means for connecting said handle portion to a free end of said second extension member, said connector means being an elongate flexible member having a first and second end, said first end being fixedly coupled to said handle portion, said second end being removably coupled to an aperture located generally adjacent to a free end of said second extension member, said connector means being a cable.

6. A skateboard device, said device comprising:
   a board for supporting a user, said board having a top surface and a bottom surface, said board having a front end and a back end, said front and back ends being tapered such that said front and back ends comprise rounded edges, said board having a pair of bends therein, one of said bends being generally nearer said front end and one of said bends being generally nearer said back end such that said front and back ends are angled upwardly with respect to a central portion of said board;
   a first wheel assembly, said first wheel assembly comprising:
      a suspension assembly being coupled to said bottom surface of said board, said suspension assembly being positioned generally adjacent to said back end of said board, said suspension assembly comprising a first and a second plate having a plurality of biasing means therebetween for biasing said first plate away from said second plate, said first plate being coupled to said bottom surface of said board, each of said biasing means being springs;
      a first truck assembly being mounted to said second plate, said first truck assembly comprising an axle having a pair of wheels mounted thereto, said axle having a longitudinal axis orientated generally perpendicular to a longitudinal axis of said board;
   a second wheel assembly, said second wheel assembly comprising:
      a rotation assembly being mounted to said bottom surface of said board, said rotation assembly being generally adjacent to said front end of said board, said rotation assembly comprising a fixed plate and a rotating plate, said fixed plate being mounted to said bottom surface of said board, said fixed plate having an annular groove therein, said annular groove facing away from said board, said rotating plate being rotatably coupled to said fixed plate, said rotating plate having an annular groove therein such that said annular groove in said fixed plate is generally opposite of said annular groove in said rotating plate, a plurality of ball bearings being between said annular grooves in said fixed and rotating plates;
      a second truck assembly being mounted to said rotating plate, said second truck assembly comprising an axle having a pair of wheels mounted thereto;
   a biasing member for biasing said second wheel assembly in a first position such that said second wheel assembly is generally directed in the same direction as said first wheel assembly, said biasing member comprising:
      a pair of springs, each of said springs have a pair of ends, one of said ends of a first spring being coupled to said rotating plate, one of said ends of a second spring being coupled to said second plate;
      a pair of rods, each of said rods having a distal portion and a proximal portion, an external surface of said proximal portions being threaded, each of said springs being coupled to the distal portion of one of said rods;
      a coupling means for removably coupling said rods together, said coupling means being a tubular member, said tubular member being generally hollow and having an internal surface being threaded, wherein each of said rods have a proximal portion removably inserted in an end of said tubular member, wherein tension between said rotating plate and said second plate may be increased by rotating said coupling means in a first direction;
   a steering assembly for altering the rotational direction of the wheels of said second wheel assembly, said steering assembly comprising:
      a first extension member being elongate and having a first end and a second end, said first end being integrally coupled to said rotating plate, said first extension member extending away from said rotating plate such that said second end extends beyond said front end of said board, said first extension member having a plurality of apertures therein;
      a second extension member being elongate, said second extension member having a plurality of apertures therein, said second extension member being removably fastened to said first extension member by a pair of fastening members extending through said apertures in said first and second extension members, each of said fastening members being a bolt and nut;
      a handle portion;
      a connector means for connecting said handle portion to a free end of said second extension member, said connector means being an elongate flexible member having a first and a second end, said first end being fixedly coupled to said handle portion, said second end being removably coupled to an aperture located generally adjacent to a free end of said second extension member, said connector means being a cable.

7. A skateboard device, said device comprising:

a board for supporting a user, said board having a top surface and a bottom surface, said board having a front end and a back end;

a first wheel assembly being coupled to said bottom surface of said board, said first wheel assembly being positioned generally nearer said back end than said front end;

a second wheel assembly being coupled to said bottom surface of said board and being positioned generally nearer said front end than said back end of said board, said second wheel assembly generally comprising an axle and a pair of wheels, said axle being adapted to pivot about an axis oriented substantially perpendicular to the bottom surface of said board;

a steering assembly for altering the rotational direction of the wheels of said second wheel assembly, said steering assembly having a first end coupled to said second wheel assembly and extending away therefrom such that a user may grasp a free end of said steering assembly; said first wheel assembly further comprises:

a suspension assembly being coupled to said bottom surface of said board, said suspension assembly being positioned generally adjacent to said back end of said board;

a first truck assembly being mounted to said suspension assembly;

said second wheel assembly further comprises:

a rotation assembly, said rotation assembly comprising a fixed plate fixedly mounted to said board and a rotating plate rotatably coupled to said fixed plate;

a second truck assembly being mounted to said second plate such that said rotating truck assembly may pivot with respect to said board;

a biasing member for biasing said second wheel assembly in a first position such that said second wheel assembly is generally directed in the same direction as said first wheel assembly, said biasing member having a first end and a second end, said first end being coupled to said first wheel assembly and said second end being coupled to said rotating plate;

wherein said steering assembly further comprises:

a first extension member being elongate and having a first end and a second end, said first end being integrally coupled to said rotating plate, said first extension member extending away from said rotating plate such that said second end extends beyond said front end of said board, said first extension member having a plurality of apertures therein;

a second extension member being elongate, said second extension member having a plurality of apertures therein, said second extension member being removably fastened to said first extension member by a pair of fastening members extending through said apertures in said first and second extension members;

a handle portion; and a connector means for connecting said handle portion to a free end of said second extension member, said connector means being an elongate flexible member having a first and a second end, said first end being fixedly coupled to said handle portion, said second end being removably coupled to an aperture located generally adjacent to a free end of said second extension member, said connector means being a cable.

* * * * *